United States Patent
Ohnishi

(10) Patent No.: US 8,437,623 B2
(45) Date of Patent: *May 7, 2013

(54) RECORDING APPARATUS AND METHOD

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1705 days.

This patent is subject to a terminal disclaimer.

(21) Appl. No.: 11/822,311

(22) Filed: Jul. 5, 2007

(65) Prior Publication Data

US 2007/0258703 A1    Nov. 8, 2007

Related U.S. Application Data

(62) Division of application No. 10/173,587, filed on Jun. 19, 2002, now Pat. No. 7,257,317.

(30) Foreign Application Priority Data

Jun. 26, 2001    (JP) ................................. 2001-192990

(51) Int. Cl.
- *H04N 5/917*    (2006.01)
- *H04N 5/77*    (2006.01)
- *H04N 5/78*    (2006.01)
- *H04N 5/89*    (2006.01)
- *H04N 5/225*    (2006.01)
- *H04N 5/765*    (2006.01)
- *H04N 5/783*    (2006.01)
- *H04N 9/43*    (2006.01)
- *H04N 9/80*    (2006.01)

(52) U.S. Cl.
USPC ........... 386/328; 386/200; 386/224; 386/225; 386/239; 386/324; 386/333; 386/334; 386/345; 348/32; 348/220.1

(58) Field of Classification Search ............... 386/33, 386/38, 46, 95, 109, 111, 112, 117, 118, 386/120, 121, 124, 125, E5.072; 348/220.1, 348/32, E5.047
See application file for complete search history.

(56) References Cited

U.S. PATENT DOCUMENTS 6,157,406 A * 12/2000 Iura et al. .................... 348/220.1
6,356,709 B1 * 3/2002 Abe et al. ....................... 386/225
(Continued)

FOREIGN PATENT DOCUMENTS

JP    10013773 A    1/1998
JP    11185451 A    7/1999
(Continued)

Primary Examiner — Thai Tran
Assistant Examiner — Syed Hasan
(74) Attorney, Agent, or Firm — Fitzpatrick, Cella, Harper & Scinto

(57) ABSTRACT

A recording apparatus produces moving image data and still picture data from the moving image data. The recording apparatus (a) records a moving image file including the moving image data and first information on a recording medium, and (b) records a still picture file including the still picture data and second information on the recording medium. The first information indicates the still picture file and the second information indicates the moving image file. The recording apparatus (a) displays a reduced image of the moving image file and information indicating presence of the still picture file on a display device, if the recording apparatus is in a first mode, and (b) displays a reduced image of the still picture file and information indicating presence of the moving image file on the display device, if the recording apparatus is in a second mode.

42 Claims, 12 Drawing Sheets

U.S. PATENT DOCUMENTS

| | | | |
|---|---|---|---|
| 6,424,795 B1 * | 7/2002 | Takahashi et al. | 386/225 |
| 6,734,877 B1 * | 5/2004 | Honda et al. | 715/721 |
| 6,801,250 B1 * | 10/2004 | Miyashita | 348/220.1 |
| 7,057,745 B1 * | 6/2006 | Tanaka et al. | 358/1.1 |
| 2001/0028396 A1 * | 10/2001 | Sato | 348/220 |
| 2001/0040629 A1 * | 11/2001 | Miyagi et al. | 348/232 |

FOREIGN PATENT DOCUMENTS

| | | |
|---|---|---|
| JP | 2000222417 A | 8/2000 |
| JP | 2000253355 A | 9/2000 |
| JP | 2000293974 A | 10/2000 |
| JP | 2000324368 A | 11/2000 |
| JP | 2001045409 A | 2/2001 |

* cited by examiner

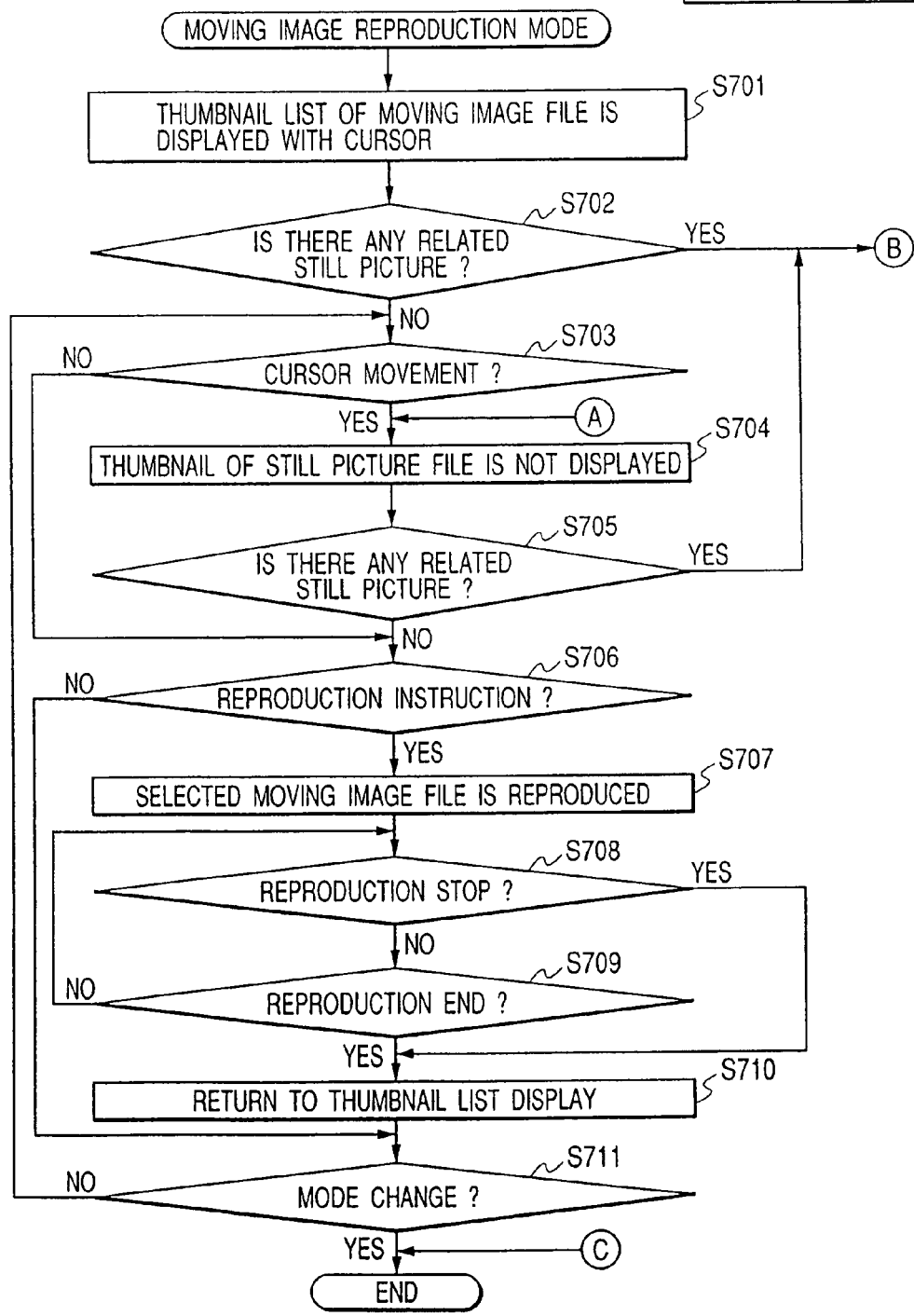

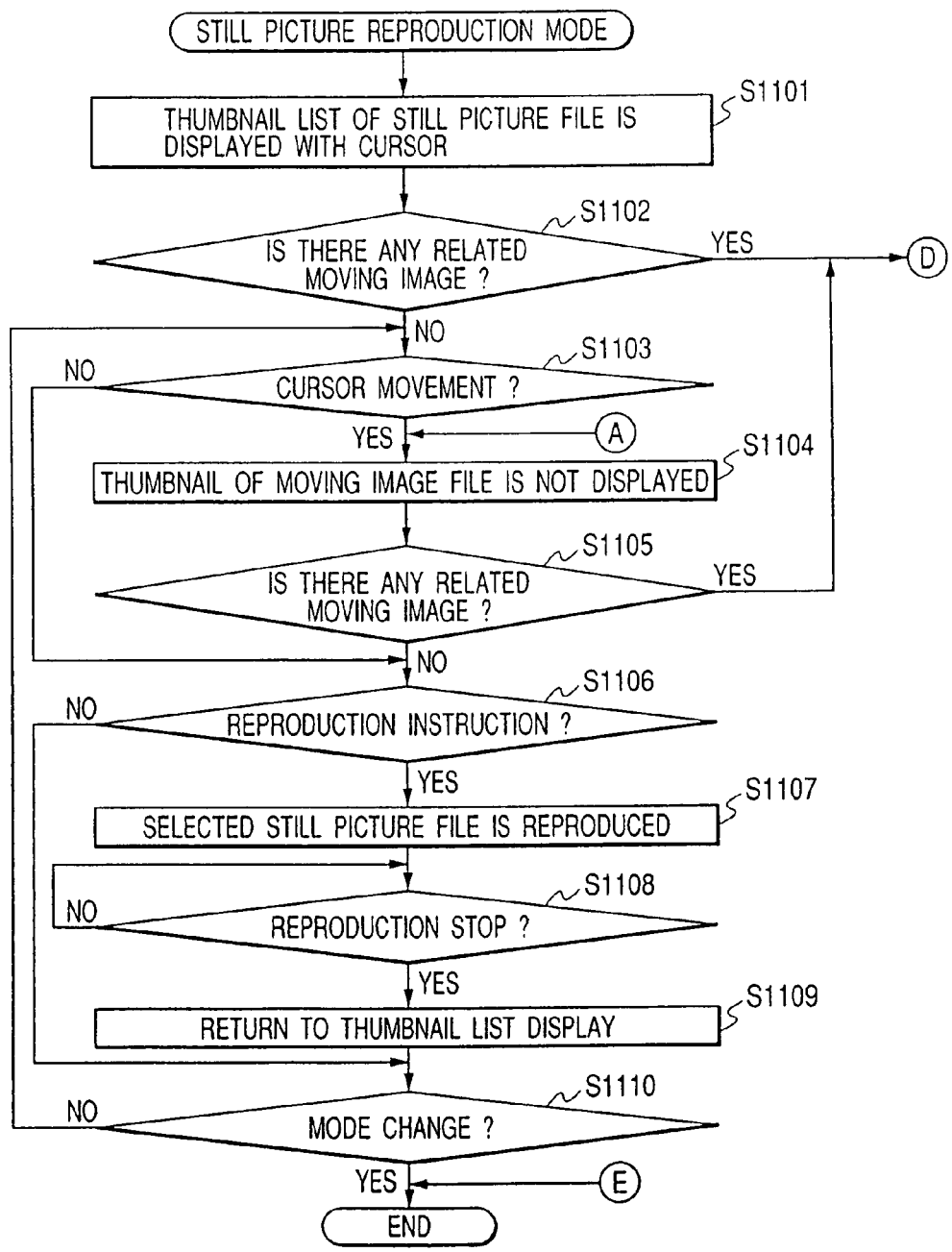

RECORDING APPARATUS AND METHOD

This application is a divisional of application Ser. No. 10/173,587, filed Jun. 19, 2002, now allowed, the contents of which are incorporated by reference herein.

BACKGROUND OF THE INVENTION

1. Field of the Invention

The present invention relates to an apparatus for recording and reproducing a moving image file and a still picture file.

2. Description of Related Art

In the past, a VTR (video tape recorder) of camera integrating type for recording a moving image signal and/or a still picture signal on a magnetic tape as a digital signal is well known. Recently, there have been proposed apparatuses in which such digital moving image signal and/or still picture image are recorded on a photo-magnetic disk.

In recording apparatuses using such disk medium, a moving image file and a still picture file are produced separately and are recorded on the disk.

In the above-mentioned disk type recording apparatus, it is also considered to provide a function in which, by utilizing the characteristic that the disk medium is a random access medium, during the recording of the moving image file, one frame is extracted from the moving image file and the extracted frame is recorded on the disk as the still picture file.

In case of such function, the still picture file selected during the recording of the moving image file is recorded on the same disk.

However, in the conventional apparatuses, when the moving image file or the still picture file is reproduced, these files had to be reproduced separately or solely and the moving image file could not be reproduced in association with the still picture file.

Thus, when it is desired to reproduce the still picture file recorded during the recording of the desired moving image file, the operator must previously ascertain all of the still picture files to find the still picture file associated with the desired moving image file. Further, conversely, when it is desired to reproduce the moving image file recorded during the recording of the desired still picture file, the operator also must previously ascertain all of the moving image files to find the moving image file associated with the desired still picture file.

Such methods have very low efficiency, and burden to the operator will be increased as the number of the moving image files and the still picture files recorded on the disk is increased.

SUMMARY OF THE INVENTION

An object of the present invention is to solve the above-described problems.

Another object of the present invention is permit efficient retrieval of a moving image file and a still picture file associated therewith.

The other object of the present invention is to provide a new function utilizing a characteristic of a random access medium such as a disk medium.

A recording apparatus according to one of preferred embodiments of the present invention comprises processing means for producing a still picture file including still picture data extracted from moving image data and for producing a moving image file including the moving image data and information associated with the still picture file, and recording means for recording the moving image file and the still picture file on a recording medium.

A recording method according to one of preferred embodiments of the present invention comprises the steps of producing a still picture file including still picture data extracted from moving image data, producing a moving image file including the moving image data and information associated with the still picture file, and recording the moving image file and the still picture file on a recording medium.

A reproducing apparatus according to one of preferred embodiments of the present invention comprises detection means for detecting whether there is a still picture file associated with a moving image file, and display control means for displaying a reduced image of the moving image file and information indicating presence of the still picture file on a display device if there is the still picture file.

A reproducing method according to one of preferred embodiments of the present invention comprises the steps of detecting whether there is a still picture file associated with a moving image file, and displaying a reduced image of the moving image file and information indicating presence of the still picture file on a display device if there is the still picture file.

Still other objects of the present invention, and the advantages thereof, will become fully apparent from the following detailed description of the embodiments.

DETAILED DESCRIPTION OF THE PREFERRED EMBODIMENTS

Now, preferred embodiments of the present invention will be explained with reference to FIGS. 1 to 11A and 11B.

Figure 1:
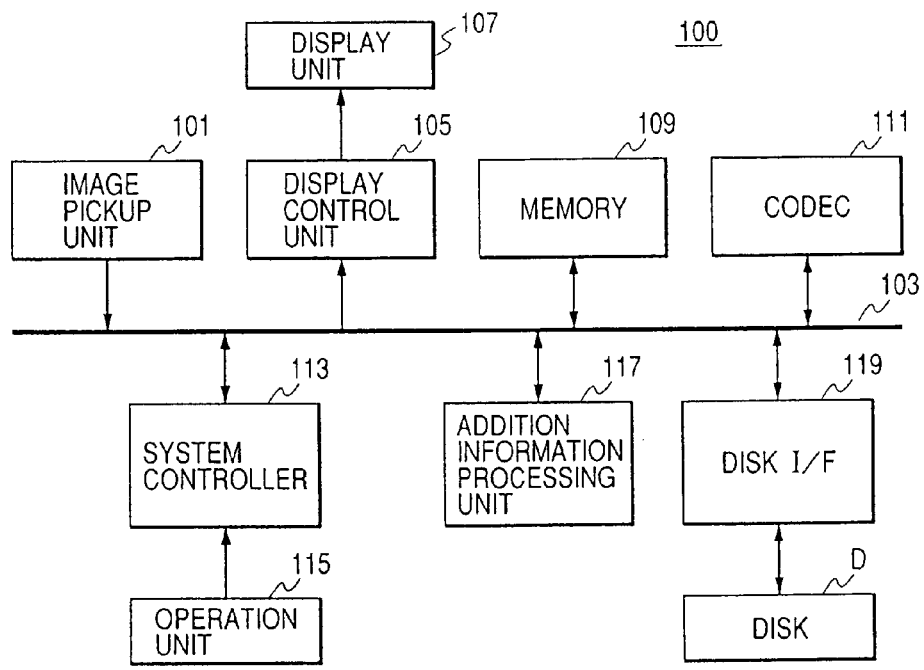
FIG. 1 is a view showing a construction of a recording/reproducing apparatus suitable for the present invention.

FIG. 1 is a block diagram showing a construction of a recording/reproducing apparatus 100 suitable for the present invention.

The apparatus 100 shown in FIG. 1 serves to record and reproduce a moving image file (including moving image data and addition information thereof) and a still picture file (including still picture data and addition information thereof)

associated with the moving image file with respect to a disk medium such as DVD-RAM to which random access can be effected.

Further, the apparatus 100 shown in FIG. 1 has a camera mode for effecting photo-taking and recording of the moving image file and/or the still picture file, and a reproduction mode for reproducing the moving image file and/or the still picture file recorded on the disk.

In FIG. 1, the apparatus comprises an image pickup unit 101 including well-known optical system and camera processing circuit, a bus 103, a display control unit 105 for controlling a displaying operation of a display unit 107 such as a liquid crystal panel, a memory 109 for storing image data, and a CODEC 111 for effecting coding/decoding processing of the image data, in which moving image data and still picture data can be coded and decoded separately, which will be described later. The apparatus also includes a system controller 113 for controlling an operation of the apparatus 100, an operation unit 115 including a mode changing switch, a moving image trigger key, a still picture trigger key and the like, an addition information processing unit 117 for processing addition information during the recording and reproducing, and a disk interface (referred to as "disk I/F" hereinafter) 119 for recording and reproducing the image data with respect to a disk D.

First of all, an operation in the camera mode will be described.

In FIG. 1, when the camera mode is set by a mode switch in the operation unit 115, the system controller 113 controls the display control unit 105 to cause an image according to the moving image data obtained by the image pickup unit 101 to display on the display unit 107. In this condition, when the moving image key in the operation unit 115 is manipulated, the system controller 113 writes the moving image data from the image pickup unit 101 in the memory 109. The moving image data written in the memory 109 is subjected to coding processing responding to the moving image data by the CODEC 111 and then is written in the memory 109 again. Incidentally, in the illustrated embodiment, the data is coded in the form of transport stream of MPEG 2.

The disk I/F 119 reads out the coded moving image data from the memory 109 and adds header to the data, and, further, the data is subjected to error correction in accordance with a recording format of the disk D, and synchronism data and ID data are added to the data, and then, the data is recorded on the disk D. Further, in this case, the processing unit 117 produces a representative image (also referred to as "thumbnail image") representative of the moving image data to be recorded and outputs it to the disk I/F 119. In the illustrated embodiment, a part obtained by reducing a size of one frame at a leading portion of the moving image data is used as the representative image of the moving image data. The disk I/F 119 stores the representative image data in a predetermined position of the header, thereby recording the image data.

When the moving image trigger key is manipulated, the system controller 113 controls the disk I/F 119 to finish the recording of the moving image data. In the illustrated embodiment, footer is added to a series of moving image data recorded during a period from instruction of moving image recording start by means of the moving image trigger key to instruction of recording end after the manipulation of the moving image trigger key, thereby producing one moving image file which is in turn recorded on the disk D.

Further, after the camera mode was set, when the still picture trigger key in the operation unit 115 is manipulated, the system controller 113 extracts one frame still picture data corresponding to the operation timing of the still picture trigger key from the moving image data outputted from the image pickup unit 101 and writes the extracted data in the memory 109. Then, the system controller 113 controls the CODEC 111 so that the one frame still picture data is subjected to coding processing suitable for the still picture, and then the data is written in the memory 109. In the illustrated embodiment, the coding is performed in accordance with JPEG standard.

The disk I/F 119 reads out the still picture data stored in the memory 109 at an appropriate timing, and header is added to the read data, and then the data is subjected to error correction and coding processing, and, synchronism data and ID data are added to the data, and then, the data is recorded on the disk D.

Next, a function in which the still picture data extracted from the moving image data is recorded during the recording of the moving image data photo-taken by the image pickup unit 101 will be explained.

In the illustrated embodiment, file names of respective files are recorded in the header. Here, it is assumed that three moving image files, i.e., "movie01.mpg", "movie02.mpg" and "movie03.mpg" and two still picture files, i.e., "still01.jpg" and "still02.jpg" are recorded on the disk D. In the illustrated embodiment, as shown in FIG. 2, an example that the moving image trigger key is manipulated to start the recording of the moving image data at a time 201, and the manipulation of the still picture trigger key is effected at times 203, 205, and the moving image trigger key is manipulated to finish or end the recording of the moving image data at a time 207 will be explained.

Figure 2:
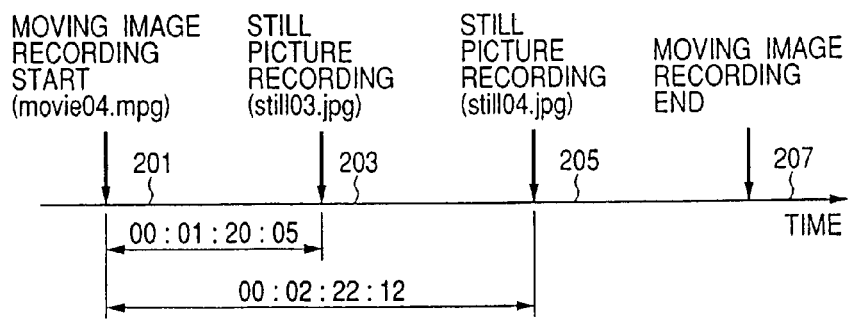
FIG. 2 is a view showing an example of a recording timing of a moving image file and a still picture file associated therewith.

When the moving image trigger key is manipulated at the time 201 in FIG. 2, the system controller 113 controls various elements of the apparatus 100 to record the moving image file on the disk D as mentioned above. In this case, the file name "movie04.mpg" is recorded in the header of the moving image data.

Then, during the recording of the moving image file, 203, when the still picture trigger key is manipulated at the time 203, as mentioned above, the system controller 113 extracts one frame still picture data from the moving image data outputted from the image pickup unit 101 and records it in the memory 109. In this case, since the moving image data is being recorded, the extracted one frame still picture data is recorded in a recording area different from a recording area for the moving image data.

Then, the CODEC 111 effects the coding of the one frame still picture data in accordance with the JPEG standard, and the coded data is written in the memory 109 again. In this case, although the coding of the moving image data is being effected in the CODEC 111, in the illustrated embodiment, while the coding processing of the moving image data is being effected, the coding processing of the still picture data can be effected simultaneously.

When the coding processing of the one frame still picture data is finished, the disk I/F 119 reads out the one frame still picture data from the memory 109 at an appropriate timing. Further, the processing unit 117 outputs the file name ("movie04.mpg") of the moving image file being recorded and a photo-taking time ("00:01:20:05") of the still picture data to the disk I/F 119. Incidentally, the photo-taking time in the illustrated embodiment is information indicating that the still picture data is extracted from which position of the moving image data and is also an elapsed time from when the recording of the moving image data is started to when the still picture data is recorded. Further, the processing unit 117 outputs the thumbnail image of the moving image data to the disk I/F 119.

The disk I/F 119 adds the header including the file name of the still picture file, thumbnail image, and the file name and the photo-taking time from the processing unit 117 to the still picture data read from the memory 109 to produce a still picture file ("still03.jpg") which is in turn recorded on the disk D. Further, the system controller 113 further controls the disk I/F 119 to record the file name "still03.jpg" of the still picture file on the header of the moving image file being recorded.

Then, when the still picture trigger key is manipulated again at the time 205, the CODEC 111 effects the coding of the one frame still picture data extracted from the moving image data, and the coded data is written in the memory 109. Then, the processing unit 117 outputs the file name of the moving image file being recorded, the photo-taking time of the still picture data and the thumbnail image of the still picture data to the disk I/F 119. The disk I/F 119 adds the header including the file name of the still picture file, the thumbnail image, and the file name and the photo-taking time of the moving image file to the still picture data read from the memory 109 to produce a still picture file ("still04.jpg") which is in turn recorded on the disk D. Further, in this case, the file name ("still04.jpg") of this still picture file is recorded on the header of the moving image file being recorded. Thereafter, when the moving image trigger key is manipulated at the time 207, the recording of the moving image file is stopped.

Figure 3:
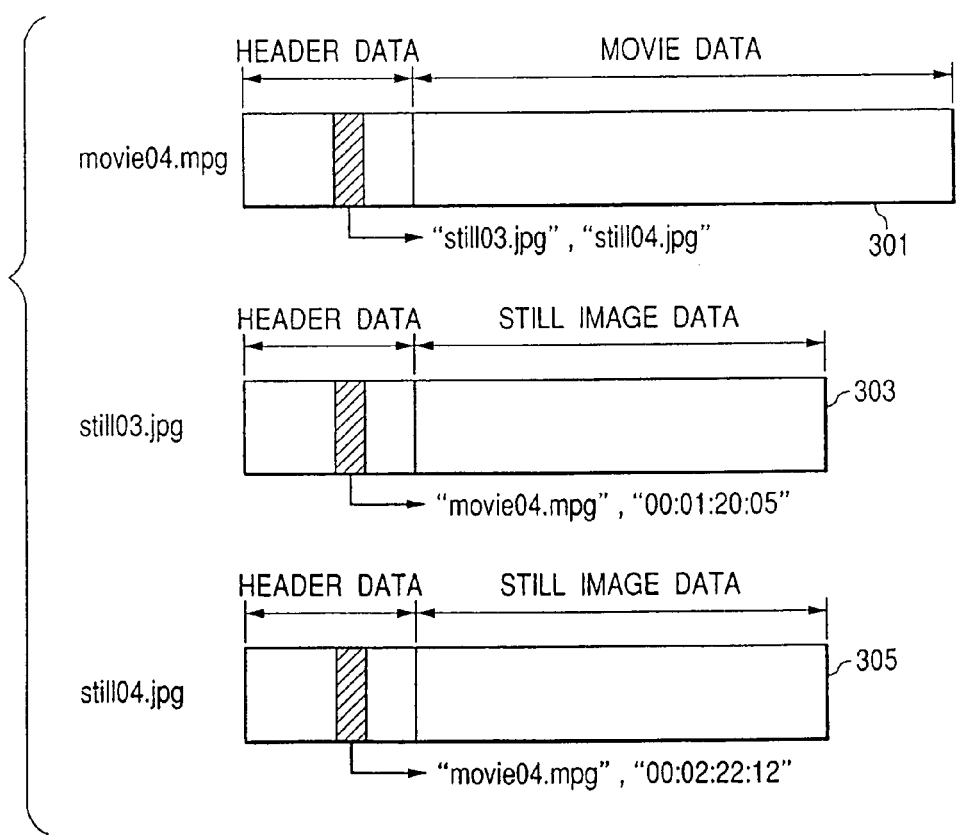
FIG. 3 is a view showing the moving image file and the still picture file.

The states of the moving image file and the still picture file produced by the above-mentioned series of record processing operations are shown in FIG. 3.

In FIG. 3, the reference numeral 301 denotes the moving image file "movie04.mpg" and 303 and 305 denote the still picture files "still03.jpg" and "still04.jpg", respectively. Each of the files has a header area and an image data area, and the file names "still03.jpg" and "still04.jpg" of the still picture files 303, 305 are recorded on the header of the moving image file 301.

Further, the file number "movie04.mpg" of the moving image file 301 which was being recorded during the recording of the still picture file and the photo-taking time of the still picture file are recorded on the header of the still picture file 303.

Similarly, the file number "movie04.mpg" of the moving image file 301 which was being recorded during the recording of the still picture file and the photo-taking time of the still picture file are recorded on the header of the still picture file 305.

Next, an operation in reproduction of the moving image file and the still picture files recorded in this way will be explained.

First of all, an operation in a moving image reproducing mode will be described.

When the moving image reproducing mode is set by the mode changing switch in the operation unit 115, the system controller 113 controls the disk I/F 119 to reproduce the header information of the moving image file recorded on the disk D. Incidentally, in the illustrated embodiment, management informations indicating recording positions on the disk regarding the moving image file and the still picture files are recorded on the disk D at predetermined positions, and the disk I/F 119 reproduces the header information of each moving image file in accordance with such management information.

The header information reproduced by the disk I/F 119 is sent to the processing unit 117 and the system controller 113.

The system controller 113 controls the processing unit 117 to send the thumbnail image of each moving image file to the display control unit 105 and controls the display control unit 105 so that the thumbnail images of the respective moving image files can be displayed on the same screen. Further, the processing unit 117 detects whether the file number of the still picture file is included in the header of the respective moving image files. If included, the file numbers of the respective moving image files and the file numbers of the still picture files associated with the respective moving image files are informed to the system controller 113.

The system controller 113 controls the display control unit 105 in accordance with a signal from the processing unit 117 to display icon representing presence of the still picture file in the vicinity of the thumbnail images of the moving image files including the file name of the still picture file at their headers.

Figure 4:
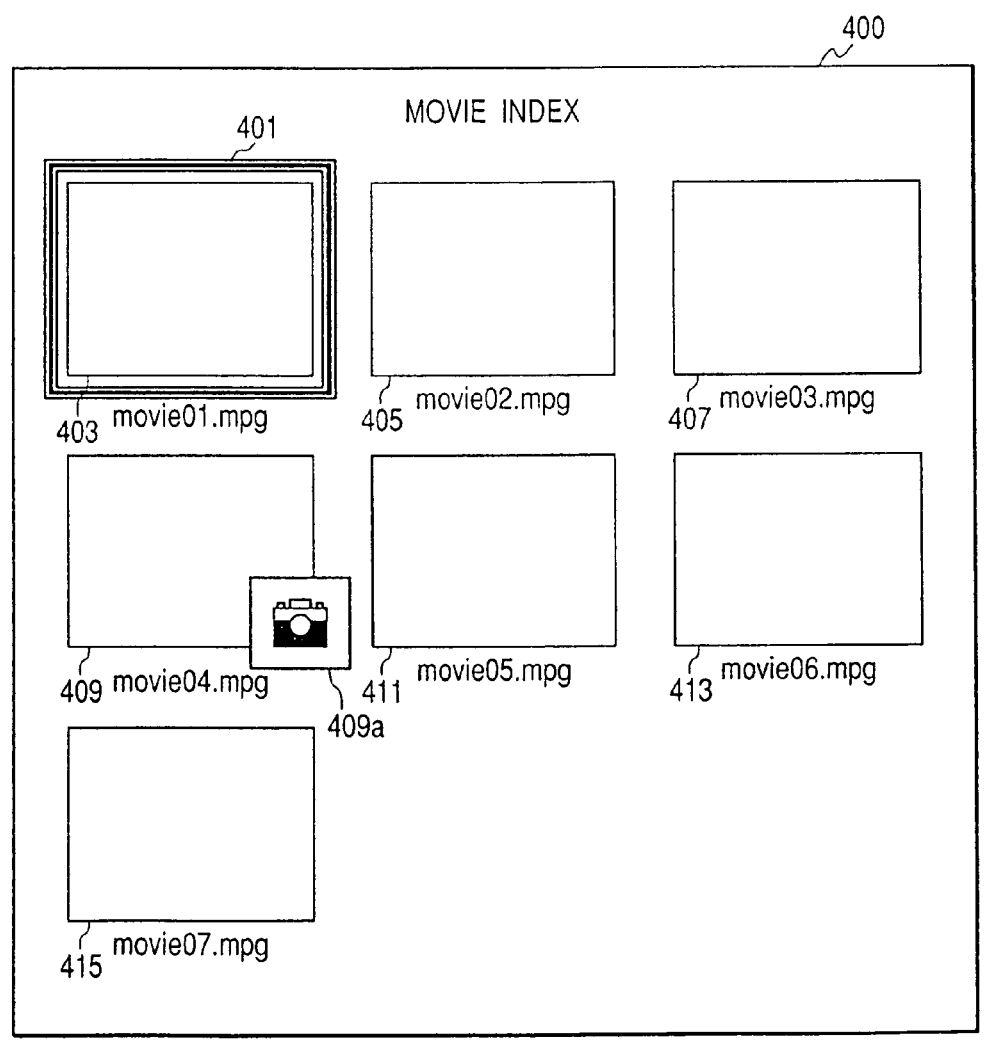
FIG. 4 is a view showing a display screen in a still picture reproducing mode.

FIG. 4 shows a screen displayed on the display unit 107 in the moving image reproducing mode.

In FIG. 4, thumbnail images 403, 405, 407, 409, 411, 413 and 415 representing seven moving image files recorded on the disk D are displayed on a same display screen 400. Icon 409a indicating presence of the still picture file recorded during the recording of the moving image file is displayed in the vicinity of the thumbnail image 409 of the moving image file "movie04.mpg".

The display control unit 105 displays a cursor 401 on one of the plural thumbnail images. The operator can shift the cursor 401 by manipulating a cross-key and the like in the operation unit 115 to select one of the plural thumbnail images.

When the operator shifts the cursor 401 to select the thumbnail image 409 to which the icon 409a is added, the system controller 113 controls the disk I/F 119 to reproduce the headers of the respective still picture files associated with the moving image file corresponding to the thumbnail image 409. The processing unit 117 detects the thumbnail images on the basis of the headers of the respective still picture files and sends them to the display control unit 105. Then, the display control unit 105 displays the thumbnail images of the respective still picture files on the display unit 107 as shown in FIG. 5.

Figure 5:
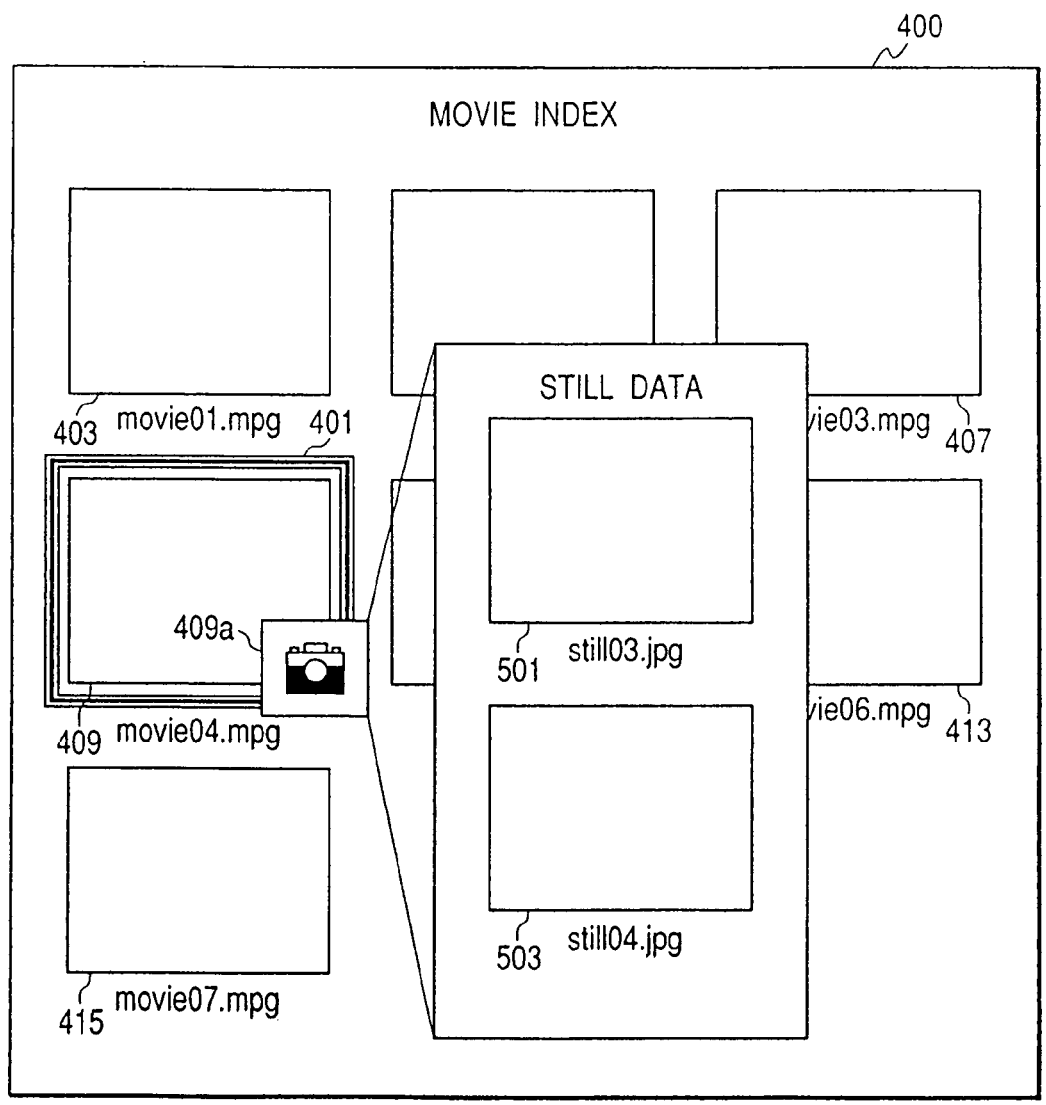
FIG. 5 is a view showing a display screen in a still picture reproducing mode.

In a condition that the screen shown in FIG. 4 or the screen shown in FIG. 5 is displayed, when a reproducing key in the operation unit 115 is manipulated, the system controller 113 controls the disk I/F 119 to reproduce the moving image file selected by the cursor 401 from the disk D. The data of the reproduced moving image file is decoded and then is displayed on the display unit 107. In this case, the display control unit 105 erases the screen of FIG. 4 or FIG. 5 and displays the reproduced moving image data on the whole area of the display unit 107. When the reproduction of the moving image file is finished or when a stop key is manipulated during the reproduction, the system controller 113 stops the reproduction of the moving image file and switches the display screen on the display unit 107 to the screen of FIG. 4 or FIG. 5.

Figure 6:
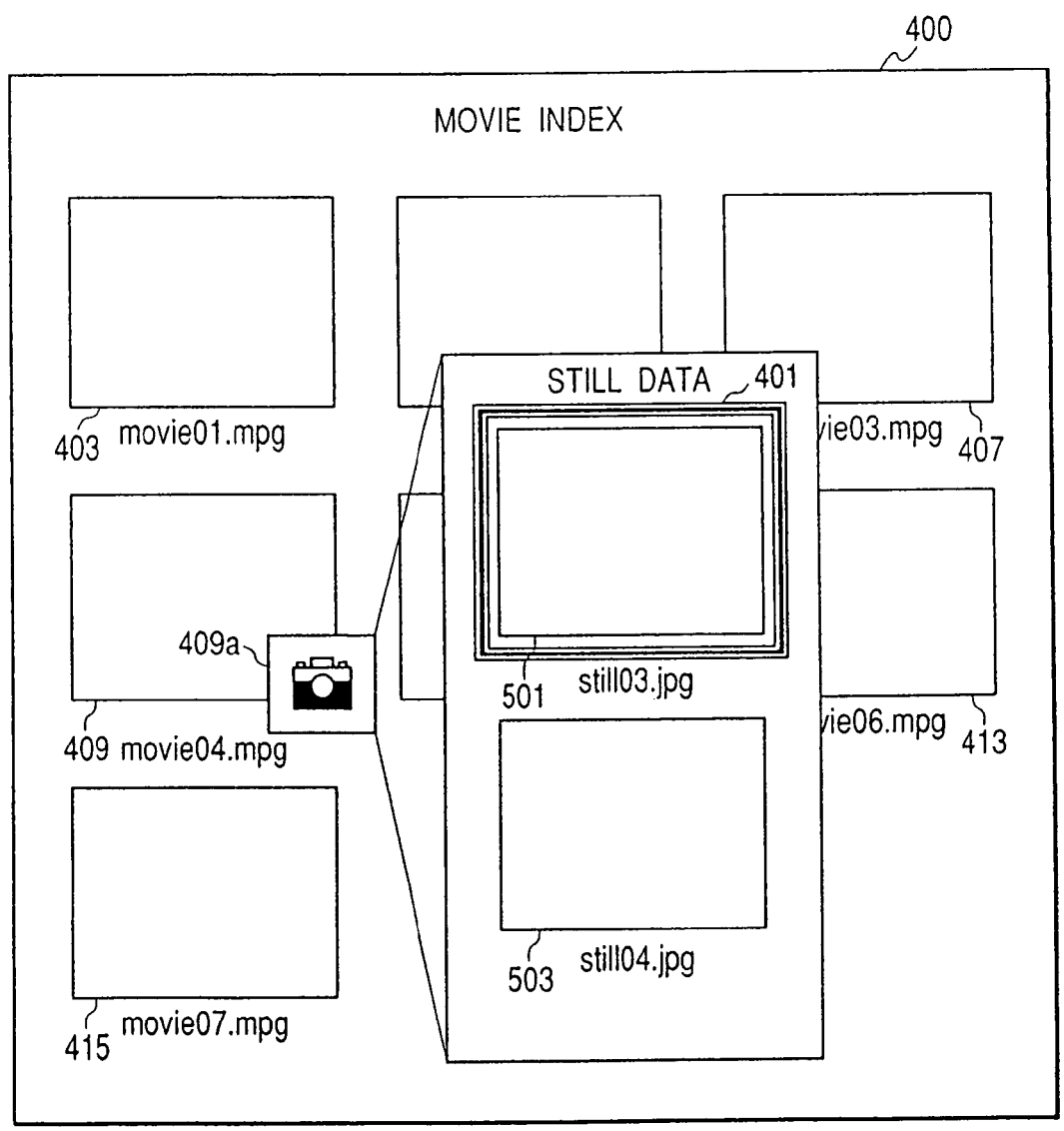
FIG. 6 is a view showing a display screen in a still picture reproducing mode.

Further, in a condition that the screen of FIG. 5 is displayed on the display unit 107, when a mode key in the operation unit 115 is manipulated, the system controller 113 controls the display control unit 105 to display the cursor 401 on one of the thumbnail images 501, 503 of the still picture files, as shown in FIG. 6.

In a condition that the screen of FIG. 6 is displayed, by manipulating the cross-key to shift the cursor 401, one of the thumbnail images of the still picture files can be selected. After the thumbnail image of the still picture file is selected, when the reproduction key in the operation unit 115 is manipulated, the system controller 113 controls the disk I/F 119 to reproduce the still picture file corresponding to the thumbnail image selected from the disk D. The reproduced still picture file is decoded by the CODEC 111, and the screen of FIG. 6 is erased and the still picture of the still picture file is displayed on the display unit 107.

In a condition that the still picture is displayed on the display unit 107, when the stop key is manipulated, the system controller 113 controls the display control unit 105 to switch the screen to the screen of FIG. 6.

Now, the above-mentioned operations will be explained with reference to flow charts shown in FIGS. 7A and 7B.

Figure 7B:
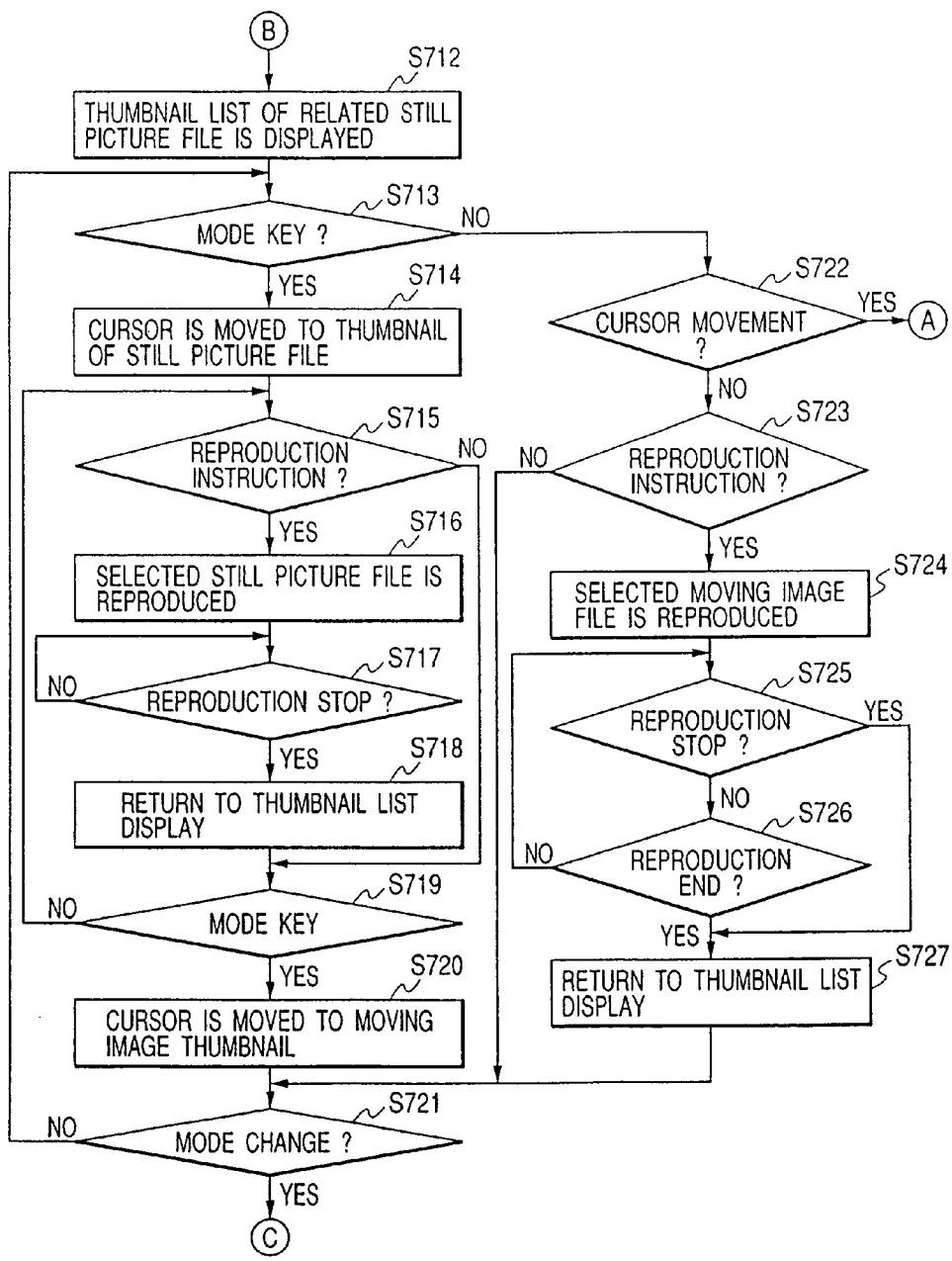
FIG. 7 is comprised of FIGS. 7A and 7B showing flow charts for explaining an operation in the still picture reproducing mode.

FIGS. 7A and 7B are flow charts showing an operation of the recording/reproducing apparatus 100 in the moving image reproducing mode.

When the moving image reproducing mode is set, presence/absence of the still picture files associated with the respective moving image files and the thumbnail images on the basis of the header information of each moving image file recorded on the disk D. And, as shown in FIG. 4, a list of icons indicating the presence of the thumbnail images of the moving image files and the still picture files is displayed on the display unit 107 together with the cursor (step S701).

Then, it is detected whether or not the file name of the still picture file associated with the moving image file in the header information of the moving image file corresponding to the thumbnail image (left upper image in FIG. 4, in the illustrated embodiment) selected with default at the start of moving image reproducing mode (step S702). If included, the thumbnail image of the still picture file is read out on the basis of the header of the associated still picture file and is displayed as shown in FIG. 5 (step S712).

Further, if there is no still picture file associated with the moving image file at the default position, it is detected whether presence of the shifting movement of the cursor in the list displayed in FIG. 4 (step S703). If no shifting movement, the program goes to a step S706. On the other hand, when the shifting movement of the cursor is detected, if the thumbnail image of the associated still picture file is displayed, the displayed thumbnail image is erased (step S704). Then, it is detected whether the still picture file associated with the moving image file corresponding to a newly selected thumbnail image is present or absent. If the associated still picture file is present, the program goes to the step S712, where the thumbnail image of the associated still picture file is displayed as shown in FIG. 5.

Then, in the step S706, in the condition that the thumbnail image of the moving image file is selected, it is detected whether there is reproduction instruction. If there is no instruction, the program goes to a step S711. On the other hand, if there is the reproduction instruction, the moving image file corresponding to the thumbnail image now selected is reproduced from the disk D (step S707). Then, the moving image file is reproduced (step S709) till instruction of reproduction stop (step S708) or reproduction end of the moving image file, and the program is returned to the thumbnail image list display (step S710). Then, in the step S711, it is detected whether there is instruction for switching to other mode. If there is no switching instruction, the program is returned to the step S703; whereas, if there is the switching instruction, the moving image reproducing mode is ended.

Further, in the step S702 or the step S705, if there is the still picture file associated with the moving image file corresponding to the selected thumbnail image, the thumbnail image of the associated still picture file is displayed, and presence/absence of the manipulation of the mode key is detected (step S713).

If there is the manipulation of the mode key, the cursor for selecting the thumbnail image is shifted onto one of the thumbnail images of the still picture files (step S714), and the program is waiting for the reproduction instruction (step S715). If there is no reproduction instruction, the program goes to a step S719; whereas, if there is the reproduction instruction, the still picture file corresponding to the selected thumbnail image is reproduced from the disk D and then is displayed on the display unit 107 as mentioned above (step S716). Then, if the reproduction stop is instructed (step S717), reproduction of the still picture file is stopped, and the program is returned to the thumbnail image list display in FIG. 6 again.

Then, in the step S719, presence/absence of manipulation of the mode key in the condition of FIG. 6 is detected. If there is no manipulation of the mode key, the program is returned to the step S715. On the other hand, if there is the manipulation of the mode key, the cursor is shifted onto the thumbnail image of the moving image file, and the program goes to a step S720.

On the other hand, in the step S713, if there is no manipulation of the mode key, it is detected whether the cursor is shifted or not. If shifted, the program goes to the step S704, where the aforementioned processing is effected (step S722). On the other hand, if the cursor is not shifted, it is detected whether there is the reproduction instruction. If there is no reproduction instruction, the program goes to a step S721 (step S723). If there is the reproduction instruction, the moving image file corresponding to the selected thumbnail image is reproduced from the disk D and then is displayed on the display unit 107 as mentioned above (step S724). Then, when there is instruction of reproduction stop or when the reproduction of the moving image file is finished, the reproduction is stopped (step S726), and the program is returned to the thumbnail image list display of the moving image files, and then the program goes to the step S721.

In the step S721, it is detected whether there is instruction for switching to other mode. If there is no switching instruction, the program is returned to the step S715; whereas, if there is the switching instruction, the moving image reproducing mode is ended.

Next, an operation in the still picture reproducing mode will be explained.

When the still picture reproducing mode is set by the mode changing switch in the operation unit 115, the system controller 113 controls the disk I/F 119 to reproduce the header information of the still picture file recorded on the disk D. The header information reproduced by the disk I/F 119 is sent to the processing unit 117 and the system controller 113.

The system controller 113 controls the processing unit 117 to send the thumbnail images of the respective still picture files included in the header information to the display control unit 105 and controls the display control unit 105 to permit the displaying of the thumbnail images of the respective still picture files on the same screen. Further, the processing unit 117 detects whether the file name of the moving image file in the header of each still picture file. If included, the file name of each still picture file and the file name of the moving image file associated with each still picture file are informed to the system controller 113.

The system controller 113 controls the display control unit 105 in accordance with the signal from the processing unit 117 to display the icon indicating the presence of the moving image file in the vicinity of the thumbnail image of the still picture file having the header including the file name of the moving image file.

Figure 8:
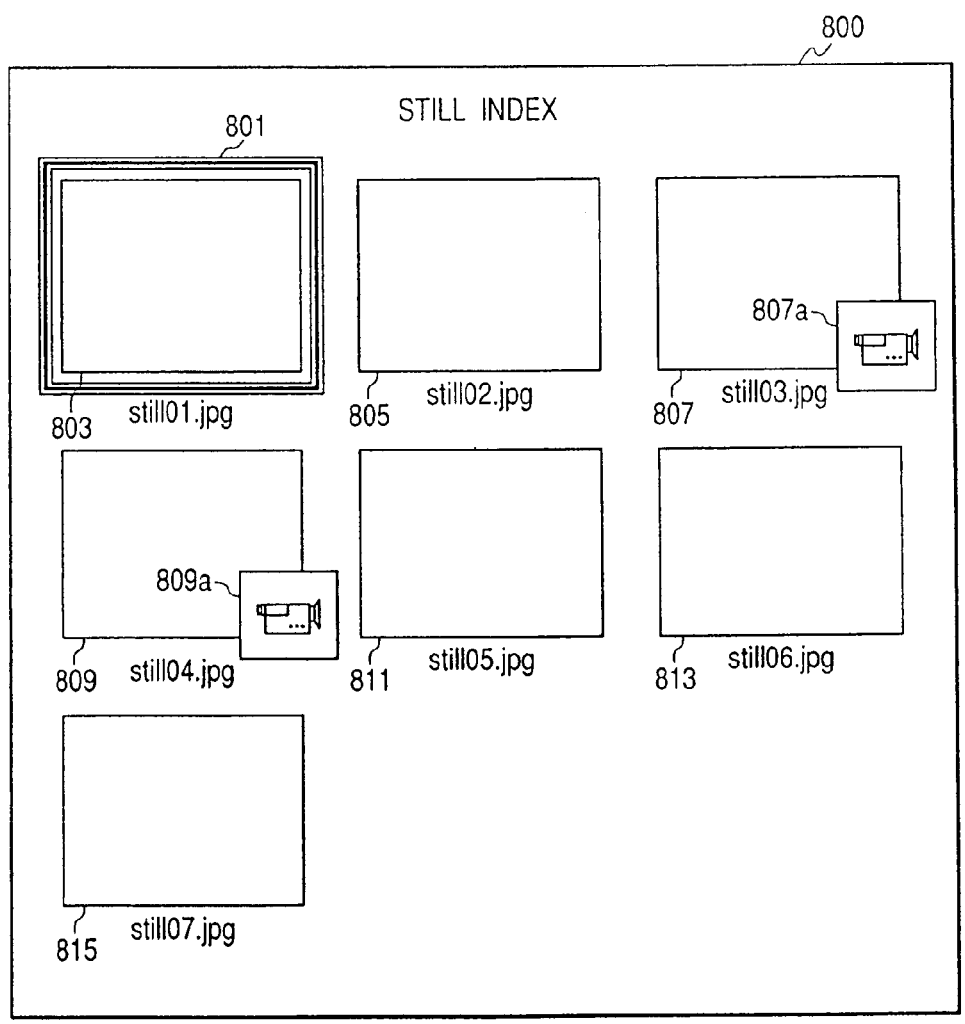
FIG. 8 is a view showing a display screen in a moving image reproducing mode.

FIG. 8 shows a screen displayed on the display unit 107 in this way in the moving image reproducing mode.

In FIG. 8, thumbnail images 803, 805, 807, 809, 811, 813 and 815 representing seven still picture files recorded on the disk D are displayed on a same display screen 800. Icon 807a indicating presence of the moving image file recorded during the recording of the still picture file "still03.jpg" is displayed in the vicinity of the thumbnail image 807 of this still picture file. Further, similarly, icon 809a indicating presence of the moving image file recorded during the recording of the still picture file "still04.jpg" is displayed in the vicinity of the thumbnail image 809 of this still picture file.

The display control unit 105 displays a cursor 801 on one of the plural thumbnail images. The operator can shift the cursor 801 by manipulating the cross-key and the like in the operation unit 115 to select one of the plural thumbnail images.

When the operator shifts the cursor 801 to select the thumbnail image 809 to which the icon 809a is added, the system controller 113 controls the disk I/F 119 to reproduce the header of the moving image file associated with the still picture file corresponding to the thumbnail image 809. The processing unit 117 detects the thumbnail image on the basis of the header of this moving image file and sends it to the display control unit 105. The display control unit 105 displays the thumbnail image 901 of this moving image file on the display unit 107 as shown in FIG. 9.

Figure 9:
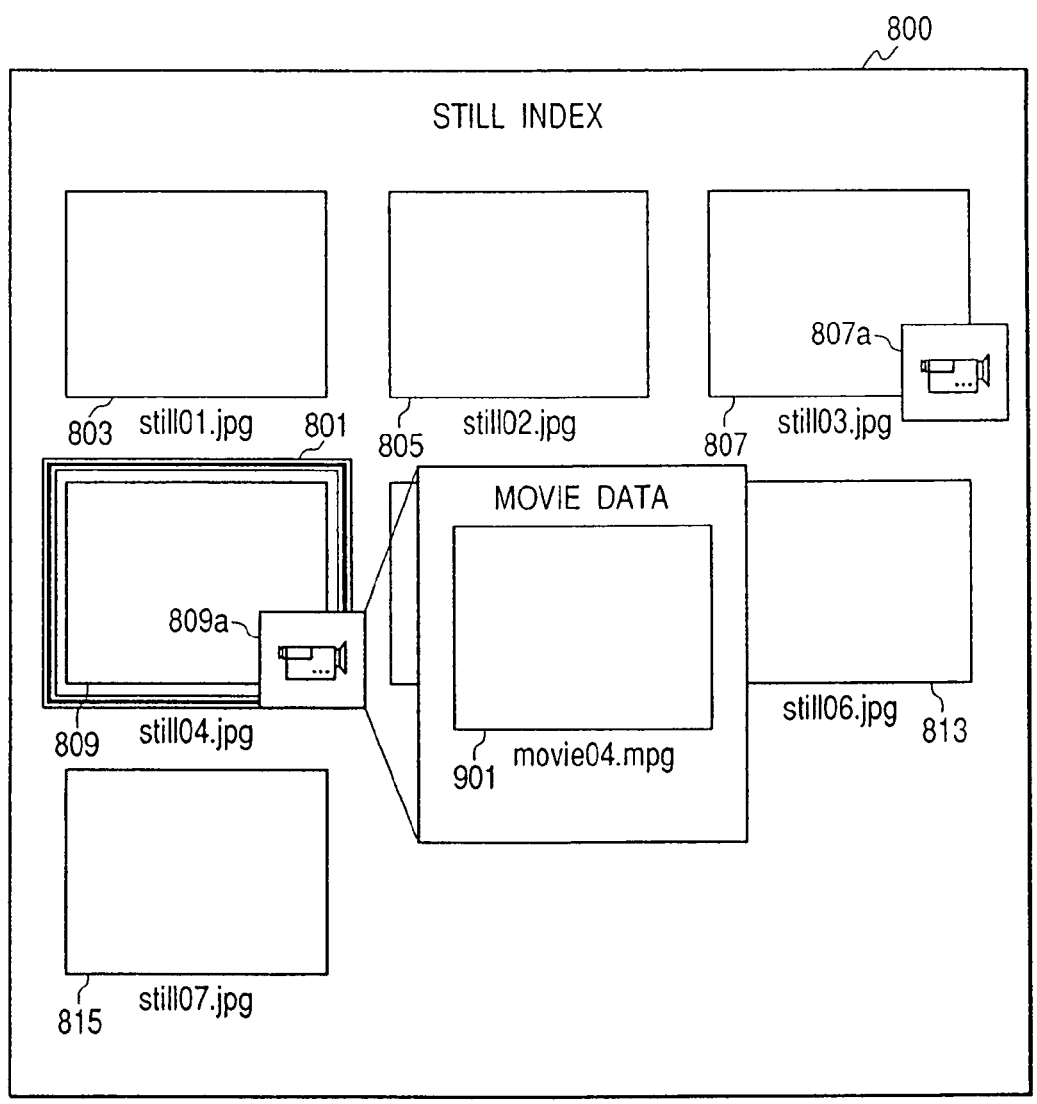
FIG. 9 is a view showing a display screen in a moving image reproducing mode.

In a condition that the screen of FIG. 8 or the screen of FIG. 9 is displayed, when the reproduction key in the operation unit 115 is manipulated, the system controller 113 controls the disk I/F 119 to reproduce the still picture file selected by the cursor 801 from the disk D. The data of the reproduced still picture file is decoded, and the decoded data is displayed on the display unit 107. In this case, the display control unit 105 erases the screen of FIG. 8 or the screen of FIG. 9 and displays the reproduced moving image data on the display unit 107 in the whole area thereof. When the stop key is manipulated during the reproduction, the system controller 113 stops the reproduction of the still picture file and switches the display screen of the display unit 107 to the screen of FIG. 8 or the screen of FIG. 9.

Figure 10:
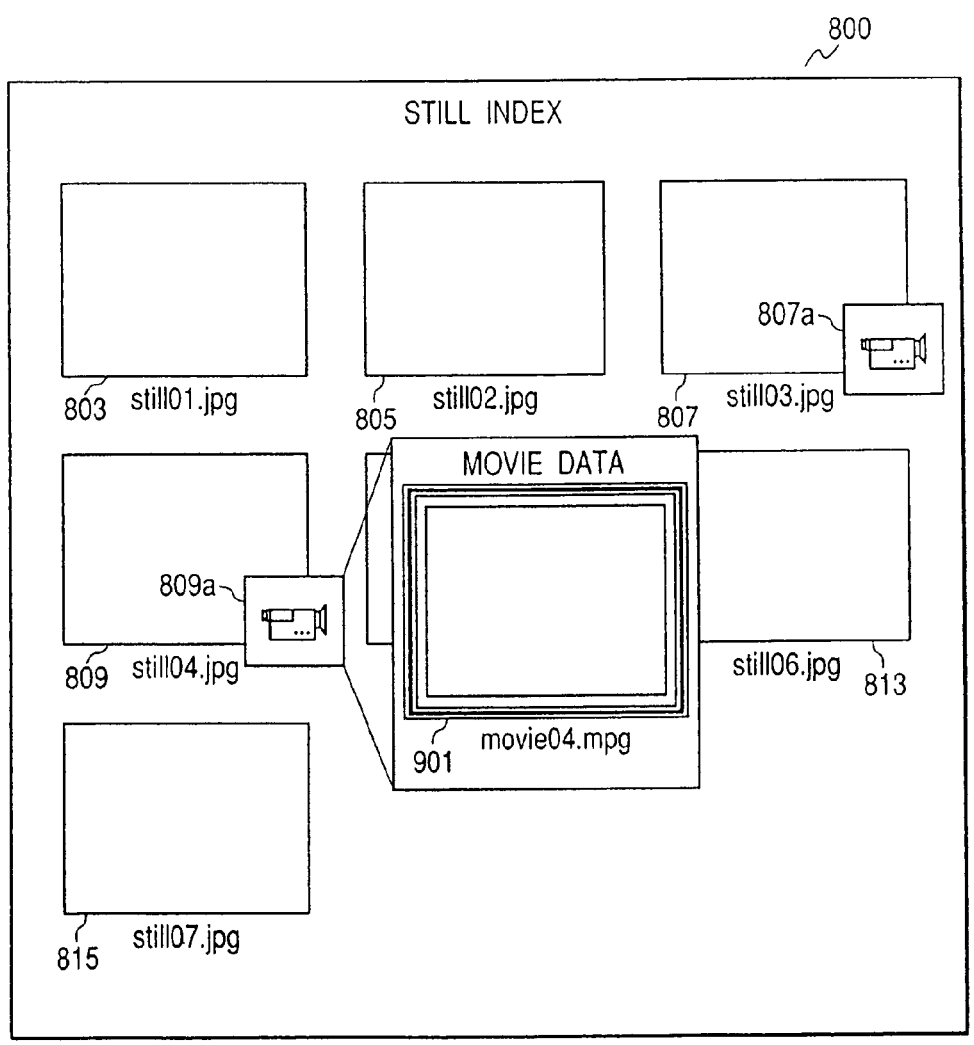
FIG. 10 is a view showing a display screen in a moving image reproducing mode.

Further, in the condition that the screen of FIG. 9 is displayed on the display unit 107, when the mode key in the operation unit 115 is manipulated, the system controller 113 controls the display control unit 105 to display the cursor 801 on the thumbnail image 901 of the moving image file as shown in FIG. 10. In a condition that the thumbnail image 901 of the moving image file is selected in this way, when the reproduction key in the operation unit 115 is manipulated, the system controller 113 controls the disk I/F 119 to reproduce the moving image file corresponding to the thumbnail image from the disk D. The reproduced moving image file is decoded by the CODEC 111, and the screen of FIG. 10 is erased, and the moving image of the moving image file is displayed on the display unit 107.

In a condition that the reproduced moving image is displayed on the display unit 107, when the stop key is manipulated or when the reproduction of the moving image file is finished, the system controller 113 controls the display control unit 105 to switch the screen to the screen of FIG. 10.

Now, the above-mentioned operations will be explained with reference to flow charts shown in FIGS. 11A and 11B.

Figure 11B:
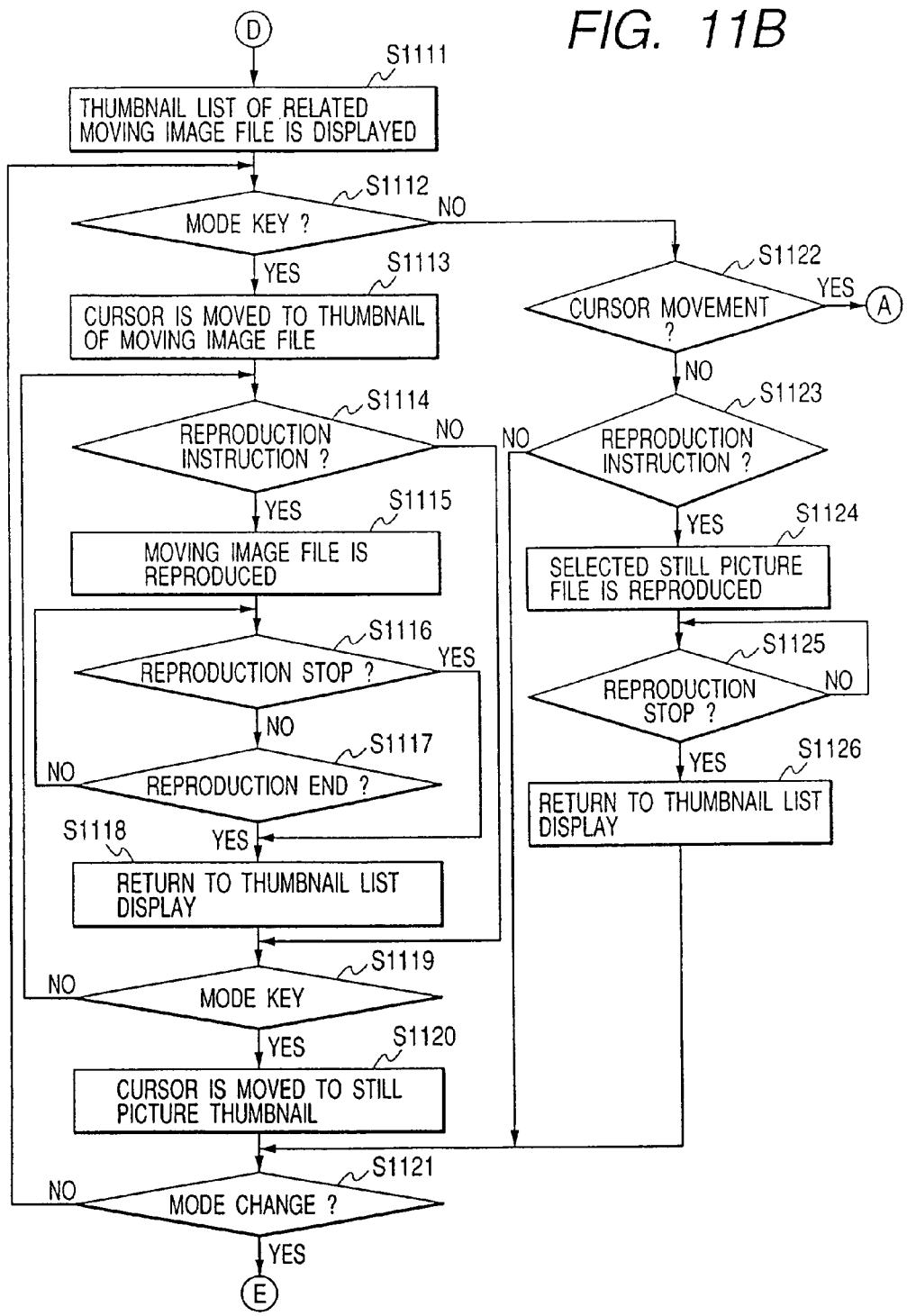
FIG. 11 is comprised of FIGS. 11A and 11B showing flow charts for explaining an operation in the moving image reproducing mode.

FIGS. 11A and 11B are flow charts of the operation of the recording/reproducing apparatus 100 in the still picture reproducing mode.

When the still picture reproducing mode is set, presence/absence of the moving image file associated with the still picture file and the thumbnail image on the basis of the header of each still picture file is detected. And, as shown in FIG. 8, a list of icons indicating the presence of the thumbnail images of the respective still picture files and the moving image files is displayed on the display unit 107 together with the cursor (step S1101).

Then, it is detected whether data indicating the file name of the moving image file associated with the still picture file is included in the header information of this still picture file corresponding to the thumbnail image (left upper image in FIG. 8, in the illustrated embodiment) selected with default (step S1102). If included, the thumbnail image is read out on the basis of the header of this associated moving image file and is displayed as shown in FIG. 9 (step S1111).

On the other hand, if there is no moving image file associated with the still picture file at the default position, in the list display shown in FIG. 8, presence/absence of the shifting movement of the cursor is detected (step 1103). If there is no shifting movement, the program goes to a step S1106. On the other hand, when the shifting movement of the cursor is detected, if the thumbnail image of the associated moving image file is displayed, this image is erased (step S1104). Then, presence/absence of the moving image file associated with the still picture file corresponding to the thumbnail image newly selected. If there is the associated moving image file, the program goes to the step S1111, where the thumbnail image of this associated moving image file is displayed as shown in FIG. 9.

Then, in the step S1106, in a condition that the thumbnail image of the still picture file is selected, it is detected whether there is reproduction instruction. If there is no instruction, the program goes to a step S1110. On the other hand, if there is the reproduction instruction, the still picture file corresponding to the thumbnail image now selected is reproduced from the disk D (step S1107). Then, the still picture is reproduced until instruction for reproduction stop is given (step S1108). If the reproduction stop instruction is given, the program is returned to the thumbnail image list display (step S1109). Then, in the step S1110, it is detected whether there is instruction for switching to other mode. If there is no switching instruction, the program is returned to the step S1103; whereas, if there is the switching instruction, the still picture reproducing mode is ended.

Further, in the step S1102 or the step S1105, if there is the moving image file associated with the still picture file corresponding to the selected thumbnail image, the thumbnail image of the associated moving image file is displayed, and presence/absence of the manipulation of the mode key is detected (step S1112).

If there is the manipulation of the mode key, the thumbnail selecting cursor is shifted onto the thumbnail image of the moving image file as shown in FIG. 10 (step S1113), and the reproduction instruction is waited (step S1114). If there is no reproduction instruction, the program goes to a step S1119; whereas, if there is the reproduction instruction, the moving image file corresponding to the thumbnail image is reproduced from the disk D and is displayed on the display unit 107 as mentioned above (step S1115). When instruction for reproduction stop is given (step S1116) or when the reproduction of the moving image file is finished (step S1117), the reproduction of the moving image file is stopped, and the program is returned to the thumbnail image list display as shown in FIG. 10 again.

Then, in the step S1119, presence/absence of the manipulation of the mode key in a condition shown in FIG. 10. If there is no manipulation of the mode key, the program is returned to the step S1114. On the other hand, if there is the manipulation of the mode key, the cursor is shifted onto the thumbnail image of the still picture file, and then, the program goes to a step S1120.

On the other hand, in the step S1112, if there is no manipulation of the mode key, it is detected whether the cursor is shifted or not. If the cursor is shifted, the program goes to the step S1104, where the above-mentioned processing is effected (step S1122). On the other hand, if the cursor is not shifted, it is detected whether the reproduction instruction is given or not. If there is no reproduction instruction, the program goes to a step S1121 (step S1123). If there is the reproduction instruction, the still picture file corresponding to the selected thumbnail image is reproduced from the disk D and is displayed on the display unit 107 as mentioned above (step S1124). Then, when the instruction for the reproduction stop is given, the reproduction is stopped (step S1125), and the program is returned to the list display of the thumbnail images of the still picture files, and then, the program goes to the step S1121 (step S1126).

In the step S1121, it is detected whether there is instruction for switching to other mode. If there is no switching instruction, the program is returned to the step S1112; whereas, if there is the switching instruction, the moving image reproducing mode is finished.

Incidentally, in the step S1111, while only one thumbnail image of the moving image file associated with the still picture file is displayed, if there is two or more moving image files associated with the still picture file, the thumbnail images of such moving image files are displayed.

Further, in the step S1115, while the moving image file is reproduced from a leading portion thereof, other than this, for example, on the basis of the photo-taking time included in the header of the still picture file, the moving image file may be reproduced from a position of the photo-taking time or in the vicinity thereof in the moving image file.

As mentioned above, in the recording/reproducing apparatus 100 according to the illustrated embodiment, when the still picture file is photo-taken during the recording of the moving image file, since there is provided a function for recording the file name of the simultaneously photo-taken still picture file on the header information of the moving image file and a function for recording the file name of the moving image file which was being recorded during the photo-taking of the still picture file on the header of this still picture file, it is not required for effecting grouping processing later, and the moving image file and the associated still picture file can easily be detected by ascertaining the header informations of these files.

Further, in the reproduction, when the list of the thumbnail images of the moving image files or the still picture files is displayed, since the icon indicating the presence of the still picture file associated with the moving image file or the icon indicating the presence of the moving image file associated with the still picture file is displayed in the vicinity of the thumbnail image of the moving image file or the still picture file, the operator can easily ascertain the presence of the still picture file associated with the moving image file or the moving image file associated with the still picture file.

Accordingly, in order to find the still picture file associated with the moving image file or the moving image file associated with the still picture file, it is not required for reproducing all of the files, and the still picture file associated with the moving image file or the moving image file associated with the still picture file can be retrieved efficiently.

Further, when the moving image reproducing mode is selected, in the condition that the list of the thumbnail images of the moving image files is displayed, the still picture file associated with each moving image file can be reproduced.

Further, similarly, when the still picture reproducing mode is selected, in the condition that the list of the thumbnail images of the still picture files is displayed, the moving image file associated with each still picture file can be reproduced.

As such, according to the recording/reproducing apparatus 100 of the illustrated embodiment, a new function utilizing the addition information indicating the moving image file or the still picture file associated with each file can easily be realized.

Incidentally, in the above-mentioned embodiment, while an example that the present invention is applied to the apparatus for recording and reproducing the moving image file and the still picture file with respect to the disk medium was explained, other than this, for example, the present invention can similarly be applied to a case utilizing a random access medium such as a memory card including a semiconductor memory.

Further, in the above-mentioned embodiment, while an example that the information regarding the file name of the moving image file or the still picture file associated with each file and the photo-taking time of the still picture file is recorded as the addition information to be recorded in the header of each file was explained, other than this, for example, information indicating the recording position of the still picture file or the moving image file on the disk D can be recorded.

When the recording position information is recorded in the header in this way, only by ascertaining the header, not only the presence/absence of the associated file but also the recording position of the associated file on the disk D can be ascertained, thereby improving the efficiency.

Further, in the above-mentioned embodiment, while an example that the thumbnail image of the still picture file is previously produced during the recording and is recorded in the header portion was explained, the present invention is not limited to such an example, but, in the reproduction mode, the thumbnail image may be produced by reducing the size of the reproduced still image data.

Further, in the above-mentioned embodiment, while an example that the addition information including the file name of the moving image file associated with the still picture file is stored in the header portion of the still picture file and the addition information including the file name of the still picture file associated with the moving image file is stored in the header portion of the moving image file was explained, other than this, the information can be stored in any position of the file such as a footer portion of the file, and, in this case, so long as the stored position is previously known, the addition information can easily be detected.

Further, the above-mentioned functions realized by the construction shown in FIG. 1 can be realized by software processing effected by a micro-computer and its peripheral devices. In this case, a storing medium storing the software program is also included in the present invention.

The above-described embodiments are merely exemplary of this invention, and are not be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. A recording apparatus comprising:
   a first producing unit which produces moving image data;
   a second producing unit which produces still image data from the moving image data; and
   a storing unit which (a) stores a moving image file including the moving image data, first information and second information in a storage medium, and (b) stores a still image file including the still image data, third information and fourth information in the storage medium, wherein the first information corresponds to the still image file, the second information indicates where the still image file is stored, the third information corresponds to the moving image file, and the fourth information indicates where the moving image file is stored.

2. The recording apparatus according to claim 1, wherein the first information includes a file name of the still image file, and
the third information includes a file name of the moving image file.

3. The recording apparatus according to claim 1, wherein the first information is added to a header or footer of the moving image file, and
the third information is added to a header or footer of the still image file.

4. The recording apparatus according to claim 1, wherein information indicating presence of the still image file is displayed in the vicinity of a reduced image corresponding to the moving image file, and
information indicating presence of the moving image file is displayed in the vicinity of a reduced image corresponding to the still image file.

5. The recording apparatus according to claim 1, further comprising:
a display control unit which (a) displays a reduced image corresponding to the still image file on a display device if a reduced image corresponding to the moving image file is selected, and (b) displays a reduced image corresponding to the moving image file on the display device if a reduced image corresponding to the still image file is selected.

6. The recording apparatus according to claim 1, wherein information indicating presence of the still image file is displayed on a reduced image corresponding to the moving image file, and
information indicating presence of the moving image file is displayed on a reduced image corresponding to the still image file.

7. The recording apparatus according to claim 1, wherein the first information is added to a part of the moving image file different from a header and footer of the moving image file, and
the third information is added to a part of the still image file different from a header and footer of the still image file.

8. A method comprising:
producing moving image data;
producing still image data from the moving image data;
storing a moving image file including the moving image data, first information and second information in a storage medium; and
storing a still image file including the still image data, third information and fourth information in the storage medium,
wherein the first information corresponds to the still image file, the second information indicates where the still image file is stored, the third information corresponds to the moving image file, and the fourth information indicates where the moving image file is stored.

9. The method according to claim 8, wherein the first information includes a file name of the still image file, and
the third information includes a file name of the moving image file.

10. The method according to claim 8, wherein the first information is added to a header or footer of the moving image file, and
the third information is added to a header or footer of the still image file.

11. The method according to claim 8, wherein information indicating presence of the still image file is displayed in the vicinity of a reduced image corresponding to the moving image file, and
information indicating presence of the moving image file is displayed in the vicinity of a reduced image corresponding to the still image file.

12. The method according to claim 8, further comprising:
displaying a reduced image corresponding to the still image file on a display device if a reduced image corresponding to the moving image file is selected; and
displaying a reduced image corresponding to the moving image file on the display device if a reduced image corresponding to the still image file is selected.

13. The method according to claim 8, wherein information indicating presence of the still image file is displayed on a reduced image corresponding to the moving image file, and
information indicating presence of the moving image file is displayed on a reduced image corresponding to the still image file.

14. The method according to claim 8, wherein the first information is added to a part of the moving image file different from a header and footer of the moving image file, and
the third information is added to a part of the still image file different from a header and footer of the still image file.

15. A recording apparatus comprising:
a first producing unit which produces moving image data;
a second producing unit which produces still image data from the moving image data; and
a storing unit which (a) stores a moving image file including the moving image data, first information and second information in a storage medium, and (b) stores a still image file including the still image data in the storage medium, wherein the first information corresponds to the still image file and the second information indicates where the still image file is stored.

16. The recording apparatus according to claim 15, wherein the first information includes a file name of the still image file.

17. The recording apparatus according to claim 15, wherein the first information is added to a header or footer of the moving image file.

18. The recording apparatus according to claim 15, wherein information indicating presence of the still image file is displayed in the vicinity of a reduced image corresponding to the moving image file.

19. The recording apparatus according to claim 15, further comprising:
a display control unit which displays a reduced image corresponding to the still image file on a display device if a reduced image corresponding to the moving image file is selected.

20. The recording apparatus according to claim 15, wherein information indicating presence of the still image file is displayed on a reduced image corresponding to the moving image file.

21. The recording apparatus according to claim 15, wherein the first information is added to a part of the moving image file different from a header and footer of the moving image file.

22. A method comprising:
producing moving image data;
producing still image data from the moving image data;

storing a moving image file including the moving image data, first information and second information in a storage medium; and storing a still image file including the still image data in the storage medium, wherein the first information corresponds to the still image file and the second information indicates where the still image file is stored.

23. The method according to claim 22, wherein the first information includes a file name of the still image file.

24. The method according to claim 22, wherein the first information is added to a header or footer of the moving image file.

25. The method according to claim 22, wherein information indicating presence of the still image file is displayed in the vicinity of a reduced image corresponding to the moving image file.

26. The method according to claim 22, further comprising: displaying a reduced image corresponding to the still image file on a display device if a reduced image corresponding to the moving image file is selected.

27. The method according to claim 22, wherein information indicating presence of the still image file is displayed on a reduced image corresponding to the moving image file.

28. The method according to claim 22, wherein the first information is added to a part of the moving image file different from a header and footer of the moving image file.

29. A recording apparatus comprising:

a first producing unit which produces moving image data;

a second producing unit which produces still image data from the moving image data; and a storing unit which (a) stores a moving image file including the moving image data in a storage medium, and (b) stores a still image file including the still image data, first information and second information in the storage medium, wherein the first information corresponds to the moving image file, and the second information indicates where the moving image file is stored.

30. The recording apparatus according to claim 29, wherein the first information includes a file name of the moving image file.

31. The recording apparatus according to claim 29, wherein the first information is added to a header or footer of the still image file.

32. The recording apparatus according to claim 29, wherein information indicating presence of the moving image file is displayed in the vicinity of a reduced image corresponding to the still image file.

33. The recording apparatus according to claim 29, further comprising:

a display control unit which displays a reduced image corresponding to the moving image file on a display device if a reduced image corresponding to the still image file is selected.

34. The recording apparatus according to claim 29, wherein information indicating presence of the moving image file is displayed on a reduced image corresponding to the still image file.

35. The recording apparatus according to claim 29, wherein the first information is added to a part of the still image file different from a header and footer of the still image file.

36. A method comprising:

producing moving image data;

producing still image data from the moving image data;

storing a moving image file including the moving image data in a storage medium; and storing a still image file including the still image data, first information and second information in the storage medium, wherein the first information corresponds to the moving image file and the second information indicates where the moving image file is stored.

37. The method according to claim 36, wherein the first information includes a file name of the moving image file.

38. The method according to claim 36, wherein the first information is added to a header or footer of the still image file.

39. The method according to claim 36, wherein information indicating presence of the moving image file is displayed in the vicinity of a reduced image corresponding to the still image file.

40. The method according to claim 36, further comprising: displaying a reduced image corresponding to the moving image file on a display device if a reduced image corresponding to the still image file is selected.

41. The method according to claim 36, wherein information indicating presence of the moving image file is displayed on a reduced image corresponding to the still image file.

42. The method according to claim 36, wherein the first information is added to a part of the still image file different from a header and footer of the still image file.

* * * * *